(12) United States Patent
Li et al.

(10) Patent No.: US 11,531,880 B2
(45) Date of Patent: Dec. 20, 2022

(54) MEMORY-BASED CONVOLUTIONAL NEURAL NETWORK SYSTEM

(71) Applicant: Huazhong University of Science and Technology, Hubei (CN)

(72) Inventors: Yi Li, Hubei (CN); Wenqian Pan, Hubei (CN); Xiangshui Miao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 869 days.

(21) Appl. No.: 16/464,977

(22) PCT Filed: Jun. 7, 2018

(86) PCT No.: PCT/CN2018/090249
§ 371 (c)(1),
(2) Date: May 29, 2019

(87) PCT Pub. No.: WO2019/227518
PCT Pub. Date: Dec. 5, 2019

(65) Prior Publication Data
US 2020/0285954 A1 Sep. 10, 2020

(30) Foreign Application Priority Data
May 29, 2018 (CN) .......................... 201810532151.X

(51) Int. Cl.
*G06N 3/08* (2006.01)
*G06N 3/04* (2006.01)
*G06N 3/063* (2006.01)

(52) U.S. Cl.
CPC ................. *G06N 3/08* (2013.01); *G06N 3/04* (2013.01); *G06N 3/063* (2013.01)

(58) Field of Classification Search
CPC ............. G06N 3/08; G06N 3/04; G06N 3/063
See application file for complete search history.

(56) References Cited

U.S. PATENT DOCUMENTS

| 9,600,763 B1 | 3/2017 | Kasagi |
| 9,646,243 B1 * | 5/2017 | Gokmen .................. G06N 3/08 |

(Continued)

FOREIGN PATENT DOCUMENTS

| CN | 106228240 A | 12/2016 |
| CN | 107463990 A | 12/2017 |

OTHER PUBLICATIONS

International Search Report and Written Opinion issued in PCT/CN2018/090249, dated Feb. 12, 2019.

*Primary Examiner* — Li B. Zhen
*Assistant Examiner* — Moriam Mosunmola Godo
(74) *Attorney, Agent, or Firm* — Hamre, Schumann, Mueller & Larson, P.C.

(57) ABSTRACT

A memory-based CNN, includes an input module, a convolution layer circuit module, a pooling layer circuit module, an activation function module, a fully connected layer circuit module, a softmax function module and an output module, convolution kernel values or synapse weights are stored in the NOR FLASH units; the input module converts an input signal into a voltage signal required by the convolutional neural network; the convolutional layer circuit module convolves the voltage signal corresponding to the input signal with the convolution kernel values, and transmits the result to the activation function module; the activation function module activates the signal; the pooling layer circuit module performs a pooling operation on the activated signal; the fully connected layer circuit module multiplies the pooled signal with the synapse weights to achieve classification; the softmax function module normalizes the (Continued)

classification result into probability values as an output of the entire network.

8 Claims, 5 Drawing Sheets

(56) References Cited

U.S. PATENT DOCUMENTS 10,572,760 B1* 2/2020 Wu ..................... G06N 3/0454
11,309,026 B2* 4/2022 Kang ................. G11C 16/0416

* cited by examiner

MEMORY-BASED CONVOLUTIONAL NEURAL NETWORK SYSTEM

This application claims priority to and the benefit of Chinese Patent Application No. 201810434049.6, entitled "NOR FLASH based Convolutional Neural Network System" and filed on May 8, 2018 in China National Intellectual Property Administration, the entire contents of which are incorporated herein by reference.

BACKGROUND

Technical Field

The disclosure relates to the technical field of artificial neural network, and more particularly to a memory-based convolutional neural network system.

Description of the Related Art

The network structure of the convolutional neural network (CNN) was first proposed by Fukushima in 1980. However, since the training algorithm is difficult to implement, it has not been widely used. In the 1990s, LeCun et al. applied a gradient-based learning algorithm to CNN and has achieved good results. After that, the researchers further improved CNN and achieved strong results in the field of image recognition. Recently, Ciresan et al. proposed a multi-layer CNN to identify numbers, letters, Chinese characters and traffic signs. CNN is also designed to mimic human visual processing and has a highly optimized structure when processing two-dimensional images. In addition, CNN can effectively extract and abstract of 2D features of images. In addition to the common advantages of deep neural networks, CNN has other desirable features. CNN is a special deep neural network model, and its particularity is embodied in two aspects: the connections between neurons are not fully connected, and the weights of the connections between some neurons in the same layer are shared (i.e., identical). Non-full connectivity and weight sharing makes the CNN more similar to biological neural networks, reducing the complexity of the network model (this is very important for the deep structure that is difficult to learn) and decreasing the number of weights.

However, most software convolutional neural network algorithms are implemented by CPUs and GPUs under the traditional von Neumann architecture. Since the deep convolutional neural networks always require a large amount of training data, and the required number of weights is up to $10^8$, it would be quite time-consuming to get data from the memory, send them to the CPU and GPU for calculation and then send the result back to the memory, failing to meet the requirement for real-time processing of data, and possibly resulting in huge hardware costs. With the rapid rise of artificial intelligence, it is necessary to find an efficient hardware implementation scheme of the CNN that goes beyond the brain heuristic computing architecture of the von Neumann architecture, to achieve storage and computing integration, thereby supporting software algorithms with higher speed and lower hardware cost.

SUMMARY

In view of the above-described defects in the art, the present disclosure aims to solve the technical problem of a large amount of training data and weights, non-real time data processing, and huge hardware costs in the existing deep convolutional neural networks.

In order to achieve the above objective, the present disclosure provides a memory-based convolutional neural network system, comprising: an input module, a convolution layer circuit module composed of NOR FLASH crossbar as convolution kernels, a pooling layer circuit module based on NOR FLASH crossbar, an activation function module, a fully connected layer circuit module composed of NOR FLASH crossbar as synapses, a softmax function module and an output module, convolution kernel values or synapse weights are stored in the NOR FLASH units.

The input module converts an input signal into a voltage signal required by the convolutional neural network, and transmits the voltage signal to the convolutional layer circuit module; the convolutional layer circuit module convolves the voltage signal with the convolution kernel values stored in the NOR FLASH units, and transmits the result to the activation function module; the activation function module activates the signal and transmits the result to the pooling layer circuit module; the pooling layer circuit module performs a pooling operation on the activated signal and the convolution kernel values stored in the NOR FLASH units, and transmits the result to the fully connected layer circuit module; the fully connected layer circuit module multiplies the pooled signal with the synapse weights stored in the NOR FLASH units to achieve classification, and transmits the classification result to the softmax function module; the softmax function module normalizes the output result of the fully connected layer circuit module into probability values, and then transmits the probability values to the output module as an output of the entire network.

It is to be understood that the memory used in the present disclosure is a NOR FLASH unit, and those skilled in the art may also select other types of memory according to actual needs. The present disclosure is not limited thereto, and will not be specifically described below.

Optionally, the system further includes: a weight processing module; the weight processing module is configured to connect the convolution layer circuit module, the pooling layer circuit module and the fully connected layer circuit module; the weight processing module includes: a conversion module and a driving module; the conversion module performs a corresponding matrix transformation mapping on the convolution kernel values or the synapse weights to convert the convolution kernel matrix or the weight matrix into a threshold characteristic of the NOR FLASH units, and transmits a threshold adjustment signal to the driving module, in which if the convolution kernel matrix element or the weight matrix element is 1 or −1, the NOR FLASH threshold voltage is adjusted to a low threshold and the threshold adjustment signal is set to 1; and if the convolution kernel matrix element or the weight matrix element is 0, the NOR FLASH threshold voltage is adjusted to a high threshold and the threshold adjustment signal is set to 0; the driving module receives the threshold adjustment signal transmitted from the conversion module, and transmits, according to the signal, pulses to the convolutional layer circuit module, the pooling layer circuit module and the fully connected layer circuit module to adjust threshold values of the NOR FLASH units, that is, to store convolution kernel values or synapse weights in the NOR FLASH units.

Optionally, the convolution kernel values or the synapse weights are obtained by off-line training; in the off-line learning algorithm, there is a training set and a test set, the training set includes a plurality of training instances, and each training instance is extracted from the instance space in an independent identically distributed manner at a probability distribution, the purpose of which is that a classifier is constructed according to the training set, and after the model is trained, the test set is used for assessing the quality of the model.

Optionally, the input module converts an external input signal into a voltage signal required by the convolutional neural network, in which the input signal is proportional to the voltage signal, that is, the larger the input signal value, the larger the corresponding voltage signal.

Optionally, the convolutional layer circuit module convolves the signal with the convolution kernel values stored in the NOR FLASH units, two NOR FLASH units are used for a convolution kernel value in the circuit, the convolution kernel is converted into two matrices K+ and K−, an input signal X is correspondingly converted to a one-dimensional matrix, output ends of the K+ array are connected to a positive input end of an operational amplifier included in the convolutional layer circuit module, output ends of the K− array are connected to a negative input end of the operational amplifier, so that the output is y=[(K+)−(K−)]*X, and an effective convolutional kernel value is (K+)−(K−), thereby achieving positive and negative convolution kernel values; in order to perform the convolution operation of the input signal in one step without an intermediate complex storage layer, when the convolution kernel values determined in the software are stored in the NOR FLASH units, the convolution kernel is expanded into a large sparse matrix that is able to be multiplied with the entire input signal; in the same row, gates of the NOR FLASH units are connected together to the input module interface, and sources of the NOR FLASH units are connected together to a driving voltage; in the same column, drains of the NOR FLASH units are connected together to the operational amplifiers, currents in the same column are brought together to achieve the addition calculation, and the outputs of the operational amplifiers are collected as a result of the convolution operation; the outputs of the operational amplifiers are transmitted to the activation function module.

Optionally, the pooling layer circuit module mainly includes an average pooling operation and a maximum pooling operation, and has the same circuit structure as that of the convolutional layer circuit module, and convolution kernel values corresponding to these two operations are different; in the same row, gates of the NOR FLASH units are connected together to the activation function module, and sources of the NOR FLASH units are connected together to a driving voltage; in the same column, drains of the NOR FLASH units are connected together to an input of an operational amplifier included in the pooling layer circuit module, currents in the same column are brought together to achieve the addition calculation, and the results of the operational amplifiers are collected as a result of the convolution operation; the outputs of the operational amplifiers are transmitted to the fully connected layer circuit module.

Optionally, the activation function module mainly includes: a sigmoid function, a hyperbolic tangent function and a rectified linear unit function; the activation function module is connected to the convolutional layer circuit module and the pooling layer circuit module, activates the convolution operation result to obtain an output y, and simultaneously converts the output into a voltage signal as an input of the pooling layer circuit module.

Optionally, the fully connected layer circuit module is connected to the pooling layer circuit module and the softmax function module, and the fully connected layer circuit module maps the final output to a linear separable space, thereby achieving classification; the fully connected layer circuit module is very similar to the convolutional layer circuit module except that the weight distribution is different, implements a simple series of multiplication and addition operations in the perceptron network, and is used to store and calculate weights while the convolution operation circuit module is used to store and calculate convolution kernel values; the fully connected layer circuit module uses two NOR FLASH units as a synapse to respectively store positive and negative weights, gates of the NOR FLASH units are connected to an output of the pooling layer circuit module, sources of the NOR FLASH units are connected to a driving voltage, drains of the NOR FLASH units storing the positive weights are connected to a positive input of the respective operational amplifier, and drains of the NOR FLASH units storing the negative weights are connected to a negative input of the respective operational amplifier; outputs of the operational amplifiers are connected to the softmax function module, the outputs of the operational amplifiers are an operation result of the fully connected layer circuit module, and the outputs are represented by y=[W1−W2]*X, where W1 and W2 are two weights stored in the NOR FLASH units, and an effective weight of the synapse is W1−W2, that is, positive and negative synapse weights are achieved; after the pooled signals are processed by the fully connected layer circuit module, they are transmitted to the softmax function module to be normalized into probability values, which then are transmitted into the output module as an output of the entire network.

Optionally, the softmax function module achieves a function of $$y = \frac{e^{X_i}}{\Sigma_j e^{X_j}},$$

i.e., normalizing the output result to a probability value, where $X_i$ represents the i-th element in the input signal X, $\Sigma_j e^{X_j}$ represents an exponent sum of all elements of the input signal, and y represents a probability output corresponding to the input signal $X_i$.

In general, by comparing the above technical solution of the present inventive concept with the prior art, the present disclosure has the following beneficial effects:

According to the memory-based convolutional neural network system provided by the present disclosure, the weight processing module converts the software-simulated convolution kernel values and synapse weights into the threshold characteristic of the NOR FLASH units, and stores them in the NOR FLASH crossbar. The input module receives external information, and the information is subjected to layer-by-layer calculation by the convolution operation, the pooling operation, the activation function, the fully connected layer and the activation function, and then output by the final output module as an output. In the convolutional layer circuit module composed of the NOR FLASH crossbar, in order to represent the positive and negative convolution kernel values, two NOR FLASH units are used for a convolution kernel value. In the fully connected circuit module, in order to represent positive and negative synapse weights, two NOR FLASH units are used as one synapse. The multi-level thresholding function of the NOR FLASH is used to simulate the continuous adjustment of convolution kernel values and synapse weights in convolutional neural network. The brain heuristic computing architecture of the traditional Von Neumann architecture is time consuming, does not meet the need of real-time data processing, and can also lead to huge hardware costs. Compared with the above-mentioned drawbacks in the prior art, the present disclosure realizes the integration of data storage and calculation in the hardware of the convolutional neural network, thereby overcoming the above disadvantages well.

BRIEF DESCRIPTION OF THE DRAWINGS

FIG. 7 is a schematic diagram of a mapping formula of a convolution kernel matrix and an input matrix according to the embodiments of the present disclosure; FIG. 7(a) is a schematic diagram of a convolution kernel matrix K converted into matrixes K+ and K−, and FIG. 7(b) is a schematic diagram of an input matrix X converted into a one-dimensional matrix;

FIG. 8 is a schematic structural diagram of an activation function module according to the embodiments of the present disclosure;

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

Figure 1:
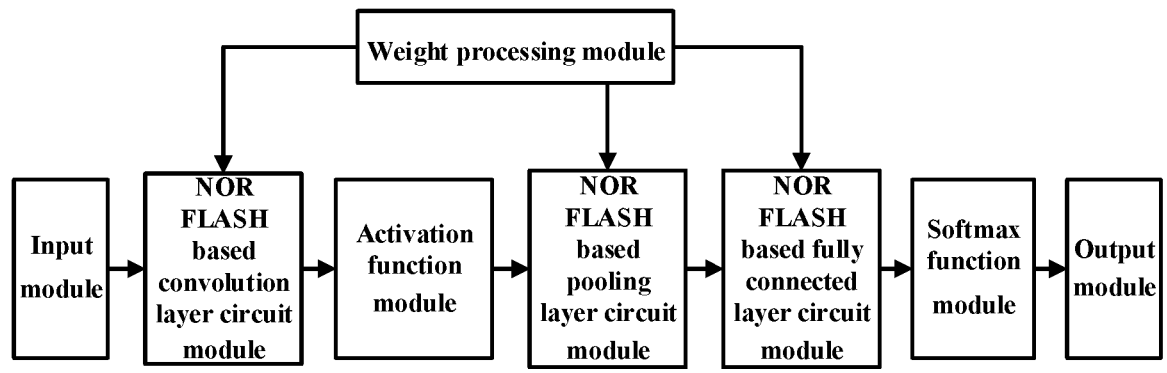
FIG. 1 is a schematic structural diagram of a memory-based CNN system according to embodiments of the present disclosure.

The present disclosure aims to provide a memory-based CNN system. FIG. 1 is a schematic structural diagram of a memory-based CNN system according to embodiments of the present disclosure. As shown in FIG. 1, the system includes: a weight processing module, an input module, a convolution layer circuit module composed of NOR FLASH crossbar as a convolution kernel, a pooling layer circuit module based on NOR FLASH crossbar, an activation function module, a fully connected layer circuit module composed of NOR FLASH crossbar as synapses, a softmax function module and an output module.

The weight processing module converts the software-derived convolution kernel values or weights of the fully connected layer into corresponding NOR FLASH threshold values, and stores them in the convolution layer circuit module, the pooling layer circuit module, and the fully connected layer circuit module.

The input module converts external input information into a voltage signal required by the CNN, and transmits the voltage signal to the convolutional layer circuit module, in which the input signal and the voltage signal follow a proportional mapping relationship, that is, the larger the input signal value, the larger the corresponding voltage.

The convolutional layer circuit module convolves the input signal with the convolution kernel values stored in the NOR FLASH units and transmits the result to the activation function module.

The activation function module activates the signal and transmits the result to the pooling layer circuit module. The pooling layer circuit module performs a pooling operation on the activated signal and the values stored in the NOR FLASH units, and transmits the result to the fully connected layer circuit module.

The fully connected layer circuit module multiplies the previously integrated signal with the weights stored in the NOR FLASH units to perform classification, and transmits the result to the softmax function module to normalize the output result into probability value, and then the softmax function module transmits the probability value to the output module to obtain the output of the entire network.

Figure 2:
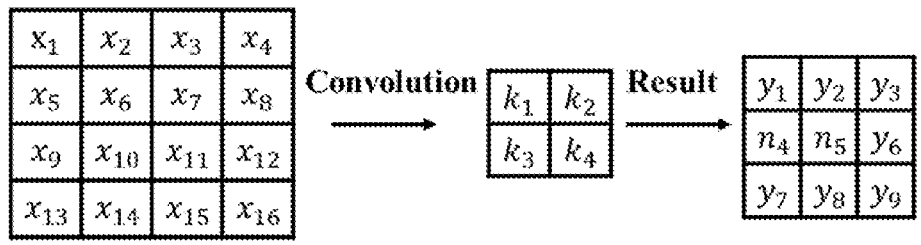
FIG. 2 is a schematic diagram of a convolution operation principle according to the embodiments of the present disclosure.

It should be noted that the convolution operation, as a generalized integration concept, has important applications in image processing, digital signal processing and the like. The convolution kernel (operator) is a matrix also known as a mask for image processing, and includes parameters for operation on the original image. The convolution kernel is usually a square grid structure with a weight for each grid in the area. When convolution calculation is performed, the convolution kernel is first inverted by 180°, the center of the convolution kernel is placed on a pixel to be calculated, then a sum of products of respective elements in the kernel and pixel values of the image the elements cover is calculated, and the obtained result is regarded as a new pixel value on this position. The convolution kernel is shifted by one bit to the right in the row direction to continue calculating the sum of products of the overlap and get the next pixel value until the row direction is completely overlapped. Then, the convolution kernel is shifted by one bit in the column direction and returned to the initial point in the row direction to calculate the sum of products of the overlap until the input matrix is completely overlapped by the convolution kernel. For an m×m input matrix convolved with an n×n convolution kernel, the resulting output matrix has a size of (m−n+1)×(m−n+1). FIG. 2 illustrates a convolution calculation process for a 3×3 output matrix obtained by convolving a 4×4 input matrix with a 2×2 convolution kernel.

Figure 3:
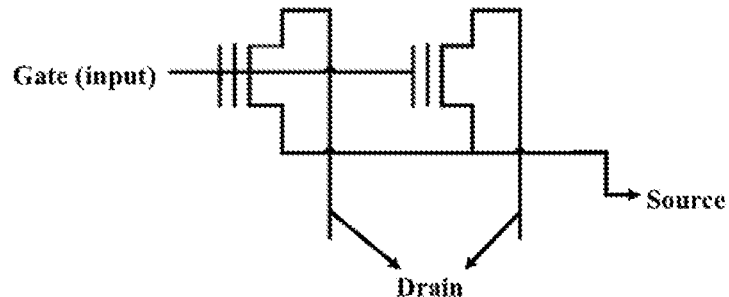
FIG. 3 is a schematic structural diagram of a synapse composed of two NOR FLASH units according to the embodiments of the present disclosure.

FIG. 3 is a schematic diagram of a synapse composed of two NOR FLASH units according to the embodiments of the present disclosure. Threshold voltages of the NOR FLASH units are changed by programming or erasing operations, thereby storing different logic values. There are a large number of multiplication operations in CNN operations. In the multiplication operation in the NOR FLASH unit, the multiplier can be stored in the unit by programming or erasing, and the multiplicand is loaded on the gate, which together determine on state of the NOR FLASH unit. A driving voltage is applied to the source terminal, and different currents can be obtained according to different on states. The drain terminal currents of the NOR FLASH units of respective columns are collected to obtain the multiplication operation result. Through using two NOR FLASH units as a synapse, positive and negative weights can be realized. The gates of the two NOR FLASH units are connected together to a voltage signal X as an input signal, the sources are connected together to a driving voltage, and the two drains are respectively connected to the input of an operational amplifier. When stored weights of the two NOR FLASH units are respectively W+ and W−, the output end of the operational amplifier is y=[(W+)−(W−)]*X, and the effective weight is [(W+)−(W−)], that is, positive and negative weights can be realized, where X is a voltage signal as an input signal.

Figure 4:
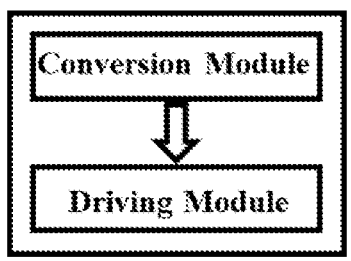
FIG. 4 is a schematic structural diagram of a weight processing module according to the embodiments of the present disclosure.

FIG. 4 is a schematic structural diagram of a weight processing module according to the present disclosure, which is connected to a convolution layer circuit module, a pooling layer circuit module and a fully connected layer circuit module. The weight processing module includes: a conversion module and a driving module. The conversion module performs a corresponding matrix transformation mapping on the convolution kernel values and the synapse weights, converts the convolution kernel matrix and the weight matrix into a threshold characteristic of the NOR FLASH, in which if the convolution kernel matrix element and the weight matrix element is 1 or −1, the NOR FLASH threshold voltage is adjusted to a low threshold; and if the convolution kernel matrix element and the weight matrix element is 0, the NOR FLASH threshold voltage is adjusted to a high threshold, and transmits the result to the driving module. The driving module receives the threshold adjustment signal transmitted from the conversion module, and sends, according to the threshold adjustment signal, pulses to the convolutional layer circuit module, the pooling layer circuit module and the fully connected layer circuit module to adjust the threshold values of the NOR FLASH units, that is, the convolution kernel matrix elements or the synapse weights are stored in the NOR FLASH units. The convolution kernel matrix elements and the synapse weights are obtained by off-line training.

Figure 5:
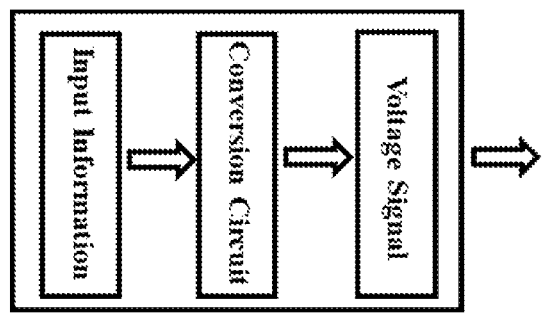
FIG. 5 is a schematic structural diagram of an input module according to the embodiments of the present disclosure.

FIG. 5 is a schematic structural diagram of an input module according to the embodiments of the present disclosure, which is connected to a convolutional layer circuit module. The input module converts external input information into a voltage signal required by the CNN through a conversion circuit module, and transmits the voltage signal to the convolution layer circuit module, in which the input signal and the voltage signal follow a proportional mapping relationship, that is, the larger the input signal value, the larger the corresponding voltage signal.

Figure 6:
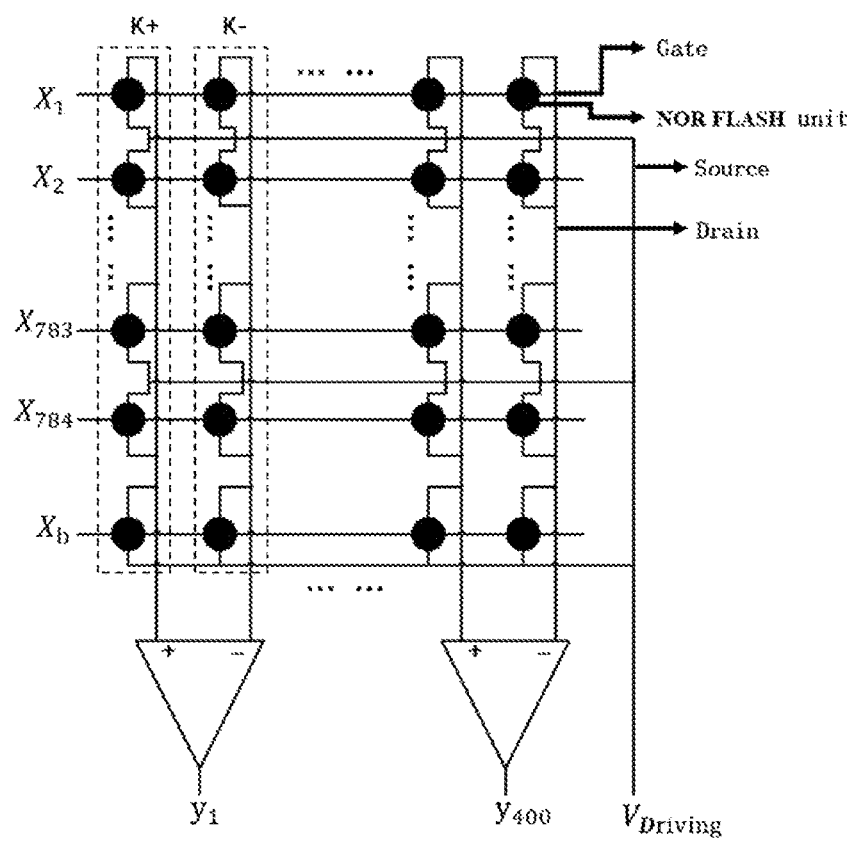
FIG. 6 is a schematic structural diagram of a NOR FLASH based convolution operation layer circuit module according to the embodiments of the present disclosure.

FIG. 6 is a schematic structural diagram of a NOR FLASH based convolutional layer circuit module according to the embodiments of the present disclosure, in which the NOR FLASH units according to the embodiments of the present disclosure are represented by black dots. In the embodiments of the present disclosure, for input signals, a MNIST handwritten font database is taken as an example, and the database includes 60,000 training sets and 10,000 test sets, that is, 70,000 grayscale images of handwritten digits, in which each image contains 28×28 pixels. The figure shows a convolution operation circuit with an input matrix of 28×28, a convolution kernel of 9×9 and an output matrix of 20×20. To represent the positive and negative convolution kernel values, two of NOR FLASH units are used in the circuit. The convolution kernel is converted into two matrices K+ and K−, the input signal X is converted to a one-dimensional matrix, drains of the array storing K+ are connected to the positive input of the operational amplifiers, and drains of the array storing K− are connected to the negative input of the operational amplifiers, so that the outputs of the operational amplifiers are y=[(K+)−(K−)]*X, that is, convolution kernels of positive and negative values can be achieved. In the neural network, bias is required, and thus the NOR FLASH array structure has 1569 rows and 400 columns. In the same row, gates of the NOR FLASH units are connected together to the input module interface, and sources of the NOR FLASH units are connected together to a driving voltage. In the same column, drains of the NOR FLASH units are connected together to the operational amplifier, currents in the same column are brought together to achieve the addition calculation, and the outputs of the operational amplifiers are collected as the result of the convolution operation. The outputs of the operational amplifiers are transmitted to the activation function module. In order to perform the convolution operation of the input signal in one step without an intermediate complex storage layer, when the convolution kernel values determined in the software are stored in the NOR FLASH units, the convolution kernel is expanded into a matrix that is able to be multiplied with the entire input signal. To this end, the convolution kernel is expanded into a large sparse matrix. Taking a 2×2 convolution kernel matrix K and a 3×3 input signal matrix X as an example, an embodiment is illustrated below.

Figures 7A, 7B, 8:
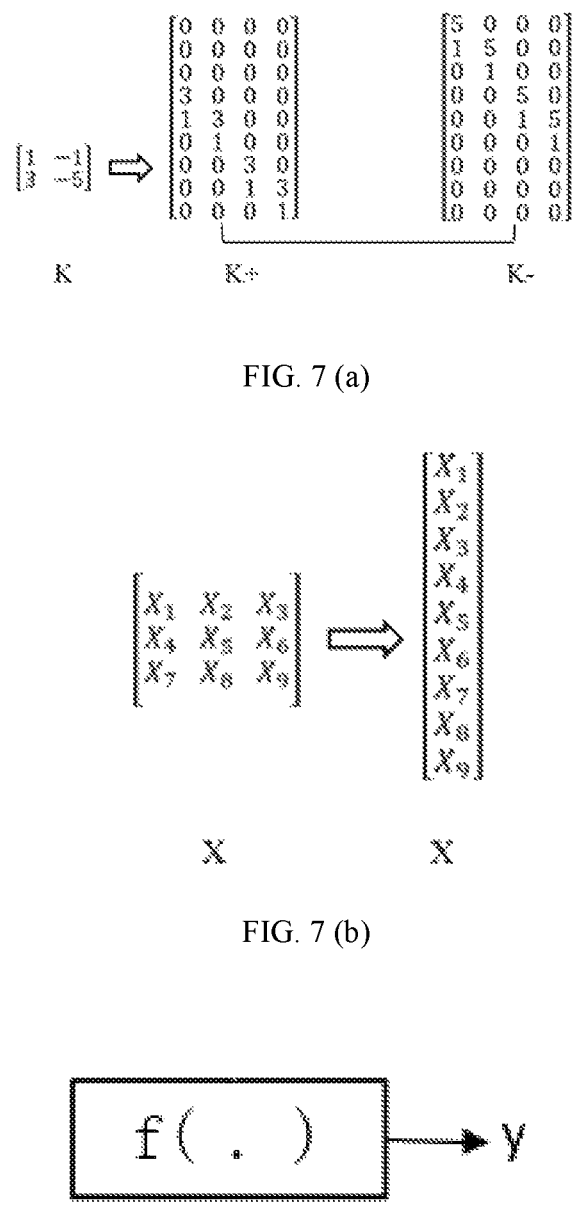

FIG. 7(a) shows how the NOR FLASH based convolution kernel matrix K is converted into matrices K+ and K− by using the proposed method. The convolution kernel is converted into two matrices, and thus, the convolution kernel with positive and negative values can be interpreted by the NOR FLASH crossbar. Since the input signal matrix X has 9 elements, the core matrixes K+ and K− must each have 9 rows.

FIG. 7(b) shows how the input matrix X is converted to a one-dimensional matrix, which is multiplied by K+ and K−, respectively. Since the size of K is 2×2 and the size of X is 3×3, the size of the output feature is 2×2. Therefore, the convolution kernel matrix must have 8 columns, and the outputs of every two columns are respectively connected to the input of the operational amplifier, and thus, four outputs are obtained at the output of the operational amplifiers. The conversion method shown in FIG. 7 is implemented in the weight processing module.

FIG. 8 is a schematic structural diagram of the activation function module in the present disclosure, in which the activation function f mainly includes: a S-type function (sigmoid function), a hyperbolic tangent (tan h) function and a rectified linear unit (ReLU) function. The activation function module is connected to the convolutional layer circuit module and the pooling layer circuit module, respectively, activates the convolution operation result to obtain the output y, and simultaneously converts the output into a voltage signal as the input of the pooling layer circuit module.

Figure 9:
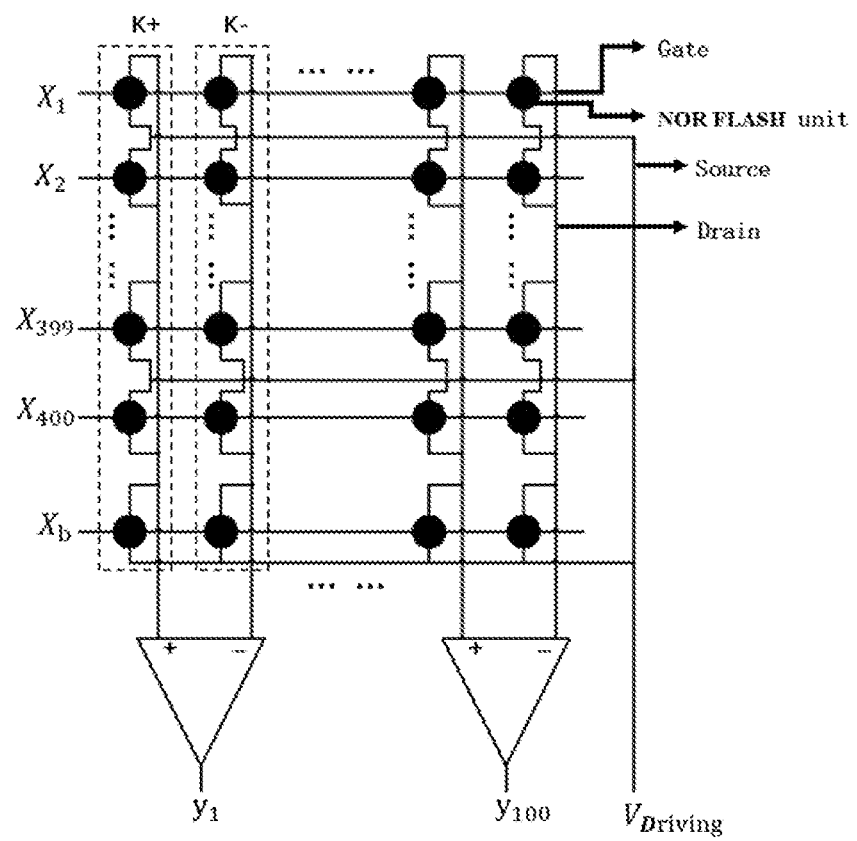
FIG. 9 is a schematic structural diagram of a pooling layer circuit module according to the embodiments of the present disclosure.

FIG. 9 is a schematic structural diagram of the pooling layer circuit module according to the embodiments of the present disclosure, which mainly includes an average pooling operation and a maximum pooling operation. The entire image is divided into several small blocks of the same size in a non-overlapping manner. In each small block, only the largest value (or average value) is taken, with other nodes discarded, and then an output with the original planar structure is maintained. The pooling layer circuit module is connected to the activation function module and the fully connected layer circuit module, respectively. The pooling operation is a simpler convolution operation, and the pooling layer circuit module has a similar circuit structure as that of the convolutional layer circuit module, differing only in that the convolution kernel values are changed. In the same row, gates of the NOR FLASH units are connected together to the activation function module, and sources of the NOR FLASH units are connected together to a driving voltage. In the same column, drains of the NOR FLASH units are connected together to the input of the operational amplifier, the currents in the same column are brought together to achieve the addition calculation, and then outputs of the operational amplifiers are collected as the result of the convolution pooling operation. The outputs of the operational amplifiers are transmitted to the fully connected layer circuit module. The pooling operation can very effectively reduce the size of the matrix, thereby reducing parameters in the final fully connected layer. At the same time, the use of the pooling layer can both speed up the calculation and prevent the over-fitting problem. In this embodiment, a pooling operation is performed with a 2×2 matrix. Since the size of the input matrix of the convolution operation layer is 20×20, the size of the output matrix is 10×10, and the size of the NOR FLASH array of the pooling layer circuit module is 801×100. If the average pooling operation is used, the convolution kernel values of the pooling layer are $$\begin{bmatrix} \frac{1}{4} & \frac{1}{4} \\ \frac{1}{4} & \frac{1}{4} \end{bmatrix},$$

and the values are stored in the NOR FLASH array by the weight processing module. After the pooling operation, the result is transmitted to the fully connected layer circuit module.

Figure 10:
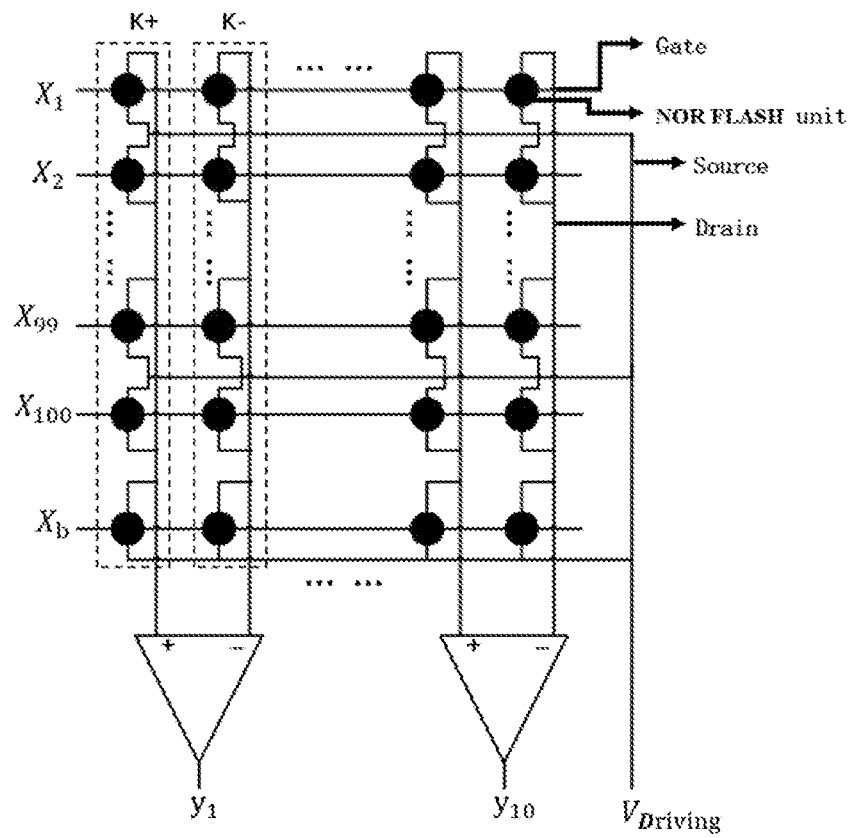
FIG. 10 is a schematic structural diagram of a fully connected layer circuit module according to the embodiments of the present disclosure.

FIG. 10 is a schematic structural diagram of a fully connected layer circuit module according to the embodiments of the present disclosure, which is connected to the pooling layer circuit module and the softmax function module, respectively. The fully connected layer (also called a feedforward layer) maps the final output to a linear separable space, thereby achieving classification. The fully connected layer circuit module is very similar to the convolution layer circuit module except that the weight distribution is different, and implements a simple series of multiplication and addition operations in the perceptron network. This circuit is used to store and calculate weights, while the convolutional layer circuit module is used to store and calculate convolution kernel values. The software-derived weights of the fully connected layer are converted into threshold values of the corresponding NOR FLASH units by the weight processing module, and then stored in the NOR FLASH units. In order to achieve positive and negative weights, the fully connected layer circuit module uses two NOR FLASH units as a synapse. Similarly, the input signal is converted into a one-dimensional matrix, the gates of the NOR FLASH units are connected to the output of the pooling layer, the sources of the NOR FLASH units are connected to a driving voltage, the drains of the NOR FLASH units storing the positive weights are connected to the positive input of the respective operational amplifiers, and the drains of the NOR FLASH units storing the negative weights are connected to the negative input of the respective operational amplifiers. The outputs of the operational amplifiers are connected to the activation function module, and the outputs of the operational amplifiers are the result of the operation of the full connection layer. The output result is y=[W1−W2]*X, where W1 and W2 are two effective weights stored in the NOR FLASH unit, and the weight of the synapse is W1−W2, that is, the positive and negative weights of the synapse can be achieved. The size of the input matrix of the pooling layer is 10×10, and if the final classification category has 10 types, the size of the NOR FLASH array of the fully connected layer circuit is 101×10. After the signal is processed by the fully connected layer circuit module, it is transmitted to the softmax function module, and then transmitted into the output module as an output of the entire network.

Figure 11:
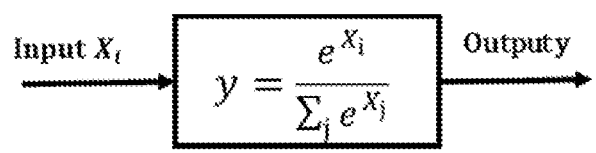
FIG. 11 is a schematic structural diagram of a softmax function module according to the embodiments of the present disclosure.

FIG. 11 is a schematic structural diagram of the softmax function module according to the present disclosure, which is connected to the fully connected layer circuit module and the output module, respectively. The softmax function module achieves a function of $$y = \frac{e^{X_i}}{\Sigma_j e^{X_j}},$$

i.e., normalizing the output to a probability value, where $X_i$ represents the i-th element in the input signal X, $\Sigma_j e^{X_j}$ represents an exponent sum of all elements of the input signal, and y represents a probability output corresponding to the input signal $X_i$.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A memory-based convolutional neural network system, comprising: an input module, a convolution layer circuit module composed of NOR FLASH crossbar as convolution kernels, a pooling layer circuit module based on NOR FLASH crossbar, an activation function module, a fully connected layer circuit module composed of NOR FLASH crossbar as synapses, a softmax function module and an output module, convolution kernel values or synapse weights are stored in a plurality of NOR FLASH units;

the input module converts an input signal into a voltage signal required by the convolutional neural network, and transmits the voltage signal to the convolutional layer circuit module;

the convolutional layer circuit module convolves the voltage signal with the convolution kernel values stored in the NOR FLASH units, and transmits the result to the activation function module;

the activation function module activates the signal and transmits the result to the pooling layer circuit module;

the pooling layer circuit module performs a pooling operation on the activated signal and the convolution kernel values stored in the NOR FLASH units, and transmits the result to the fully connected layer circuit module;

the fully connected layer circuit module multiplies the pooled signal with the synapse weights stored in the NOR FLASH units to achieve classification, and transmits the classification result to the softmax function module;

the softmax function module normalizes the output of the fully connected layer circuit module into a probability value, and then transmits the probability value to the output module as an output of the entire network, the memory-based convolutional neural network system further comprises a weight processing module, the weight processing module is configured to connect the convolution layer circuit module, the pooling layer circuit module and the fully connected layer circuit module;

the weight processing module includes: a conversion module and a driving module;

the conversion module performs a corresponding matrix transformation mapping on the convolution kernel values or the synapse weights to convert a convolution kernel matrix or a weight matrix into a threshold characteristic of the NOR FLASH units, and transmits a threshold adjustment signal to the driving module, in which if the convolution kernel matrix element or the weight matrix element is 1 or −1, the NOR FLASH threshold voltage is adjusted to a low threshold, and the threshold adjustment signal is set to 1; and if the convolution kernel matrix element or the weight matrix element is 0, the NOR FLASH threshold voltage is adjusted to a high threshold, and the threshold adjustment signal is set to 0;

the driving module receives the threshold adjustment signal transmitted from the conversion module, and transmits, according to the signal, pulses to the convolutional layer circuit module, the pooling layer circuit module and the fully connected layer circuit module to adjust threshold values of the NOR FLASH units, that is, to store convolution kernel values or synapse weights in the NOR FLASH units.

2. The memory-based convolutional neural network system according to claim 1, wherein the convolution kernel values or the synapse weights are obtained by off-line training; in the off-line learning algorithm, there is a training set and a test set, the training set includes a plurality of training instances, and each training instance is extracted from the instance space in an independent identically distributed manner at a probability distribution, the purpose of which is that a classifier is constructed according to the training set, and after the model is trained, the test set is used for assessing the quality of the model.

3. The memory-based convolutional neural network system according to claim 2, wherein the input module converts an external input signal into a voltage signal required by the CNN, in which the input signal is proportional to the voltage signal, that is, the larger the input signal value, the larger the corresponding voltage signal.

4. The memory-based convolutional neural network system according to claim 1, wherein the activation function module mainly includes: a sigmoid function, a hyperbolic tangent function and a rectified linear unit function; the activation function module is connected to the convolutional layer circuit module and the pooling layer circuit module, activates the convolution operation result to obtain an output y, and simultaneously converts the output value into a voltage signal as an input of the pooling layer circuit module.

5. The memory-based convolutional neural network system according to claim 1, wherein the fully connected layer circuit module is connected to the pooling layer circuit module and the softmax function module, and the fully connected layer circuit module maps the final output to a linear separable space, thereby achieving classification; the fully connected layer circuit module and the convolutional layer circuit module have different weight distributions, the fully connected layer circuit module implements a simple series of multiplication and addition operations in the perceptron network, and is used to store and calculate weights while the convolution operation circuit module is used to store and calculate convolution kernel values; the fully connected layer circuit module uses two NOR FLASH units as a synapse to respectively store positive and negative weights, gates of the NOR FLASH units are connected to an output of the pooling layer circuit module, sources of the NOR FLASH units are connected to a driving voltage, drains of the NOR FLASH units storing the positive weights are connected to a positive input of the respective operational amplifier, and drains of the NOR FLASH units storing the negative weights are connected to a negative input of the respective operational amplifier; outputs of the operational amplifiers are connected to the softmax function module, the outputs of the operational amplifiers are an operation result of the fully connected layer circuit module, and the outputs are represented by y=[W1−W2]*X, where W1 and W2 are two weights stored in the NOR FLASH units, and an effective weight of the synapse is W1−W2, that is, positive and negative synapse weights are achieved; after the pooled signals are processed by the fully connected layer circuit module, they are transmitted to the softmax function module to be normalized into probability values, which then are transmitted into the output module as an output of the entire network.

6. The memory-based convolutional neural network system according to claim 1, wherein the softmax function module achieves a function of $$y = \frac{e^{X_i}}{\Sigma_j e^{X_j}},$$

that is normalizing the output to a probability value, where $X_i$ represents the i-th element in the input signal X, $X_j$ represents the j-th element in the input signal X, e represents exponent of $X_i$ or $X_j$, $\Sigma_j e^{X_j}$ represents an exponent sum of all elements of the input signal, and y represents a probability output corresponding to the input signal $X_i$.

7. A memory-based convolutional neural network system, comprising: an input module, a convolution layer circuit module composed of NOR FLASH crossbar as convolution kernels, a pooling layer circuit module based on NOR FLASH crossbar, an activation function module, a fully connected layer circuit module composed of NOR FLASH crossbar as synapses, a softmax function module and an output module, convolution kernel values or synapse weights are stored in a plurality of NOR FLASH units;

the input module converts an input signal into a voltage signal required by the convolutional neural network, and transmits the voltage signal to the convolutional layer circuit module;

the convolutional layer circuit module convolves the voltage signal with the convolution kernel values stored in the NOR FLASH units, and transmits the result to the activation function module;

the activation function module activates the signal and transmits the result to the pooling layer circuit module;

the pooling layer circuit module performs a pooling operation on the activated signal and the convolution kernel values stored in the NOR FLASH units, and transmits the result to the fully connected layer circuit module;

the fully connected layer circuit module multiplies the pooled signal with the synapse weights stored in the NOR FLASH units to achieve classification, and transmits the classification result to the softmax function module;

the softmax function module normalizes the output of the fully connected layer circuit module into a probability value, and then transmits the probability value to the output module as an output of the entire network, wherein the convolutional layer circuit module convolves the signal with the convolution kernel values stored in the NOR FLASH units, two NOR FLASH units are used for a convolution kernel in the circuit, the convolution kernel is converted into two matrices K+ and K−, an input signal X is correspondingly converted to a one-dimensional matrix, outputs of the K+ array are connected to a positive input of an operational amplifier included in the convolutional layer circuit module, outputs of the K− array are connected to a negative input of the operational amplifier, so that an output result is y=[(K+)−(K−)]*X, and an effective convolutional kernel value is (K+)−(K−), thereby achieving positive and negative convolution kernel values; in order to perform the convolution operation of the input signal in one step without an intermediate complex storage layer, when the convolution kernel values determined in the software are stored in the NOR FLASH units, the convolution kernel is expanded into a large sparse matrix that is able to be multiplied with the entire input signal; in the same row, gates of the NOR FLASH units are connected together to the input module interface, and sources of the NOR FLASH units are connected together to a driving voltage; in the same column, drains of the NOR FLASH units are connected together to the operational amplifiers, currents in the same column are brought together to achieve the addition calculation, and the outputs of the operational amplifiers are collected as a result of the convolution operation; the outputs of the operational amplifiers are transmitted to the activation function module.

8. A memory-based convolutional neural network system, comprising: an input module, a convolution layer circuit module composed of NOR FLASH crossbar as convolution kernels, a pooling layer circuit module based on NOR FLASH crossbar, an activation function module, a fully connected layer circuit module composed of NOR FLASH crossbar as synapses, a softmax function module and an output module, convolution kernel values or synapse weights are stored in a plurality of NOR FLASH units;

the input module converts an input signal into a voltage signal required by the convolutional neural network, and transmits the voltage signal to the convolutional layer circuit module;

the convolutional layer circuit module convolves the voltage signal with the convolution kernel values stored in the NOR FLASH units, and transmits the result to the activation function module;

the activation function module activates the signal and transmits the result to the pooling layer circuit module;

the pooling layer circuit module performs a pooling operation on the activated signal and the convolution kernel values stored in the NOR FLASH units, and transmits the result to the fully connected layer circuit module;

the fully connected layer circuit module multiplies the pooled signal with the synapse weights stored in the NOR FLASH units to achieve classification, and transmits the classification result to the softmax function module;

the softmax function module normalizes the output of the fully connected layer circuit module into a probability value, and then transmits the probability value to the output module as an output of the entire network, wherein the pooling layer circuit module mainly includes an average pooling operation and a maximum pooling operation, and has the same circuit structure as that of the convolutional layer circuit module, and convolution kernel values corresponding to these two operations are different; in the same row, gates of the NOR FLASH units are connected together to the activation function module, and sources of the NOR FLASH units are connected together to a driving voltage; in the same column, drains of the NOR FLASH units are connected together to an input of an operational amplifier included in the pooling layer circuit module, currents in the same column are brought together to achieve the addition calculation, and the results of the operational amplifiers are collected as a result of the convolution operation; the outputs of the operational amplifiers are transmitted to the fully connected layer circuit module.

* * * * *